(No Model.) 2 Sheets—Sheet 2.
T. CONROY.
ELECTRIC ARC LAMP.
No. 462,624. Patented Nov. 3, 1891.
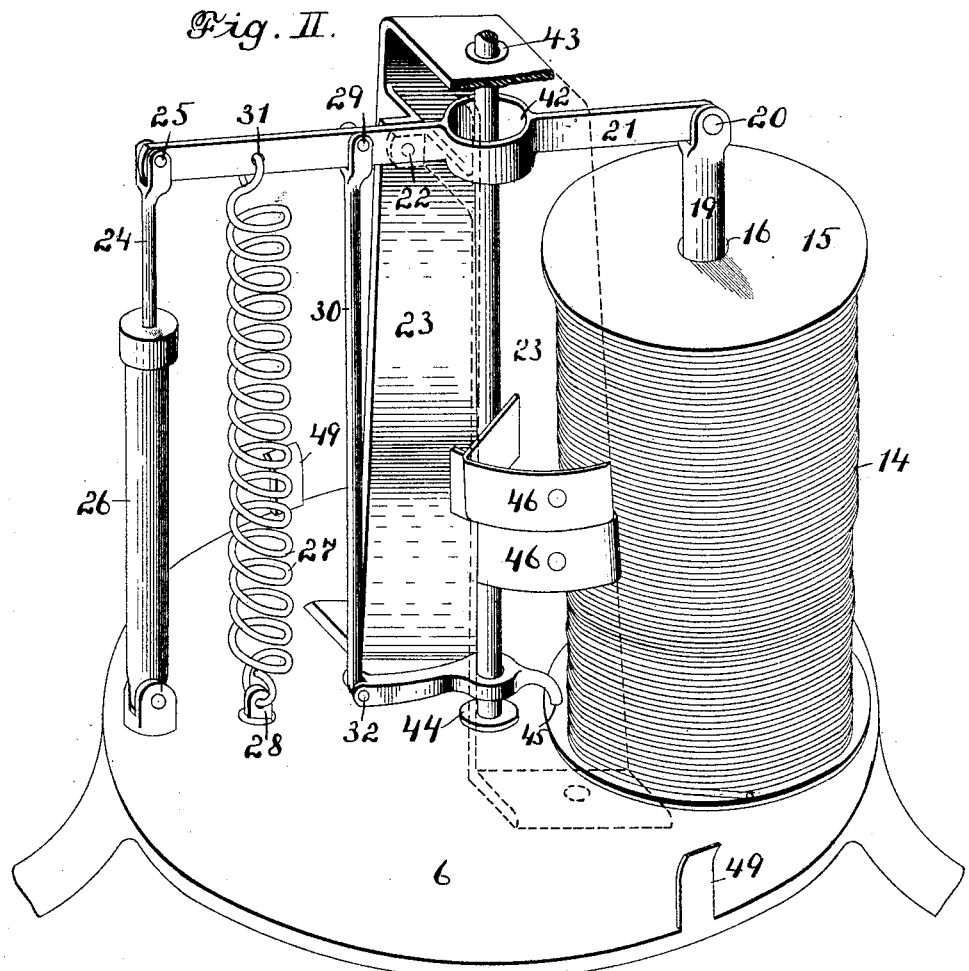
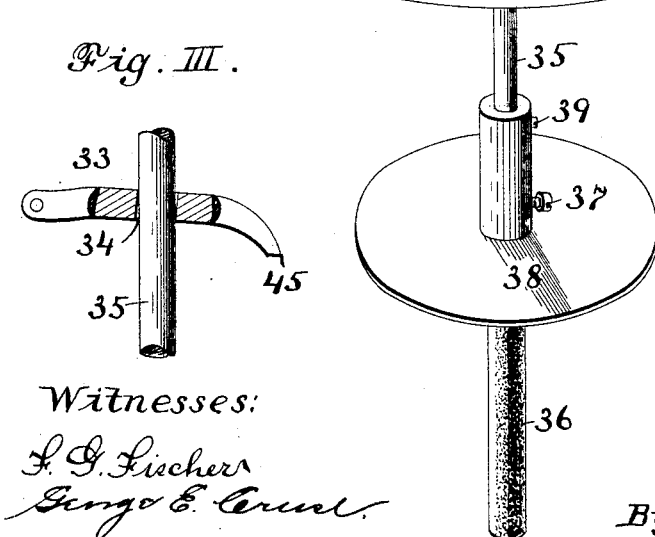
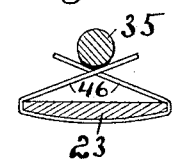
Witnesses:
F. G. Fischer
George E. Cruse
Inventor:
Thomas Conroy,
By Knight Bros.
Attys.

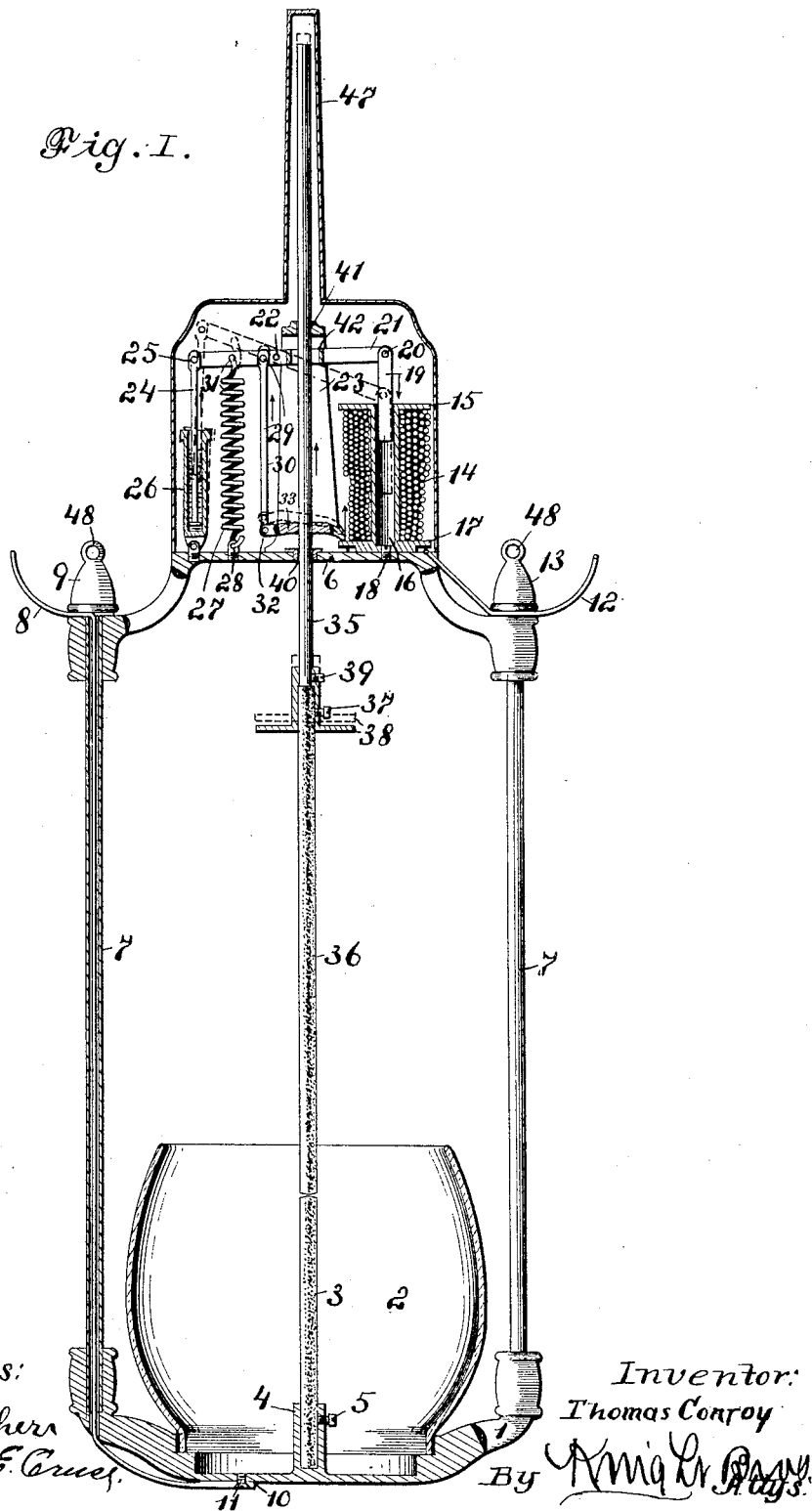

United States Patent Office.

THOMAS CONROY, OF KANSAS CITY, MISSOURI, ASSIGNOR OF TWO-THIRDS TO ALBERT W. DOLD AND LEWIS P. FUHRMAN, OF SAME PLACE.

ELECTRIC-ARC LAMP.

SPECIFICATION forming part of Letters Patent No. 462,624, dated November 3, 1891.

Application filed February 16, 1891. Serial No. 381,622. (No model.)

*To all whom it may concern:*

Be it known that I, THOMAS CONROY, of Kansas City, in the county of Jackson and State of Missouri, have invented certain new and useful Improvements in Electric Lamps for Incandescent Circuits, of which the following is a full, clear, and exact description, reference being had to the accompanying drawings, which form a part of this specification.

My invention relates to certain new and useful improvements in electric lamps to be used on incandescent circuits; and my invention consists in certain features of novelty which are hereinafter described, and pointed out in the claim.

Figure I is a vertical section of my improved lamp. Fig. II is an enlarged detail perspective of the same. Fig. III is an enlarged detail side elevation of the device for operating the upper carbon. Fig. IV is a transverse section of the standard with brush secured thereto and a rod for holding the carbon.

Referring to the drawings, 1 represents the base, which supports the globe 2 and the lower carbon 3, the carbon resting in a socket 4, which is a part of the base 1 and secured therein by set-screw 5. The base 1 is connected with a head 6 by vertical hollow rods 7, the negative wire 8 passing through the binding-post 9 and down through one of the hollow rods 7 to a point 10, where it is secured by a set-screw 11. The positive wire 12 is connected with the head 6 by the binding-post 13, then passing on in several convolutions, as shown at 14, around a hollow spool 15, having a vertical opening 16, said spool having a base 17, secured to the head 6 at 18.

19 represents a rod working in the vertical opening 16 of the spool 15, pivoted at its upper end, as shown at 20, to a lever 21, said lever 21 being fulcrumed at 22 to a standard 23, which is supported by the head 6.

24 represents a piston pivoted at 25 to the opposite end of the lever 21, said piston working in a dash-pot 26, containing a suitable liquid, in order to equalize or control the movement of the lever 21, and being pivoted at its lower end to the head 6.

27 represents a coil-spring secured at its lower end at 28 to the head 6 and by its upper end, as shown at 29, to the lever 21.

30 represents a rod pivoted at 31 to the lever 21, said rod also being pivoted at its lower end, as shown at 32, to a clutch 33, said clutch having a central opening 34, through which passes a rod 35 for supporting the upper carbon 36, the carbon 36 being secured by set-screw 37 to a head 38, said head in turn being secured to the rod 35 by the set-screw 39. The rod 35 operates vertically through the head 6, as shown at 40, and through the standard 23, as shown at 41, and through the lever 21, as shown at 42, the portions of said lever surrounding said rod, but not touching the same. The standard 23 and the head 6 are supplied with non-conducting bushings, as shown at 43 44. The clutch 33 is provided with a downwardly-extending projection 45, which at times comes in contact with the base 17 of the spool or magnet 15.

46 represent brushes, which are secured to the standard 23, which come in contact with the rod 35 to transmit the current to the same and from thence to the carbon 36. These brushes are formed, as shown in Fig. IV, of a piece of spring metal surrounding one leg of the standard 23 and having its ends crossed and bearing against opposite sides of the rod 35.

In operation, when the upper and lower carbon-points are nearly in contact with each other and the arc formed the resistance will be at its lowest point and the current consequently greater. At this time the magnet 15 will attract the rod 19, working in the vertical opening in said magnet, depressing the end of the lever 21, to which said rod is attached, as shown in the dotted lines, Fig. I, and of course raising the opposite end, raising the piston 24 in the dash-pot 26, and creating a tension of the spring 27, the rod 30 at this time raising the clutch 33 upward, which binds against the rod 35, which supports the upper carbon, thereby raising said rod and carbon and increasing the resistance to the carbons. As the resistance is increased the current in the magnet 15 is of course decreased. The core 19 rises upward by the tension of the spring 27 on the opposite end of the lever 21, the rod 30 traveling downward, and as the end 45 of the clutch 33 comes in contact with the base 17 the rod 35 is released to some extent and slides downward into position to form the proper arc, the operation being repeated automatically as often as is necessary to hold the carbons in the correct relation to each other, the dash-pot 26 equalizing or governing the movement of the lever 21.

47 represents a cap which fits down on the head 6 and protects the operating parts.

48 represents eyelets on the binding-posts 9 and 13, by which the lamp can be suspended, the cover 47 being held, in connection with the head 6, by means of spring-extensions 49.

I claim as my invention—

In an electric lamp, the combination of the head 6, spool 15, having a vertical opening 16, a rod working in said opening, a lever to which said rod is attached, a frame 23, to which said lever is fulcrumed, carbon-supporting rod 35, and brushes 46, connected with the frame 23 and having their ends crossed on the rod 35 and in contact therewith, substantially as described.

THOMAS CONROY.

Witnesses:
 JAS. E. KNIGHT,
 F. G. FISCHER.